United States Patent [19]

Totten

[11] 3,848,395

[45] Nov. 19, 1974

[54] MEANS FOR AND METHOD OF DISPENSING MEDICINAL TABLETS AND CAPSULES

[76] Inventor: George A. Totten, 200 N. El Camino Real, Oceanside, Calif. 92054

[22] Filed: Sept. 19, 1973

[21] Appl. No.: 398,574

[52] U.S. Cl. ............... 53/35, 53/390, 141/246, 214/1 C
[51] Int. Cl. ............................................. B65b 67/02
[58] Field of Search ............... 53/26, 35, 235, 390; 141/246, 247; 214/1 C

[56] References Cited
UNITED STATES PATENTS

| 316,638 | 4/1885 | Moore | 53/390 X |
|---|---|---|---|
| 2,492,081 | 12/1949 | Williams | 214/1 C |
| 3,461,643 | 8/1969 | Strand | 53/390 X |

Primary Examiner—Robert L. Spruill
Attorney, Agent, or Firm—Duane C. Bowen

[57] ABSTRACT

A selected number of medicinal tablet or capsule objects are separated from a bulk supply by a means and method including pouring an excess number on a template supported on a tray. The template has quinary rows and files of openings. By manipulation, all of the openings are filled with objects, the excess supply is separated, and the template is lifted, leaving the objects arranged in quinary rows and files. The selected number of objects are moved from the rows and files into a receptacle and then into a dispensing container. The tray is pivotally mounted to facilitate separation of retained and removed objects.

11 Claims, 19 Drawing Figures

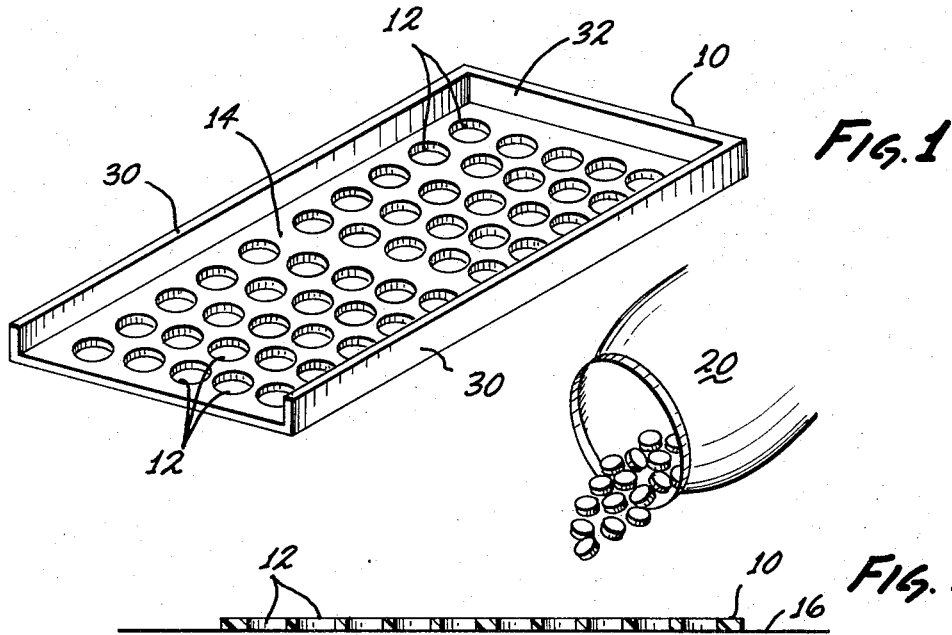
Fig. 1
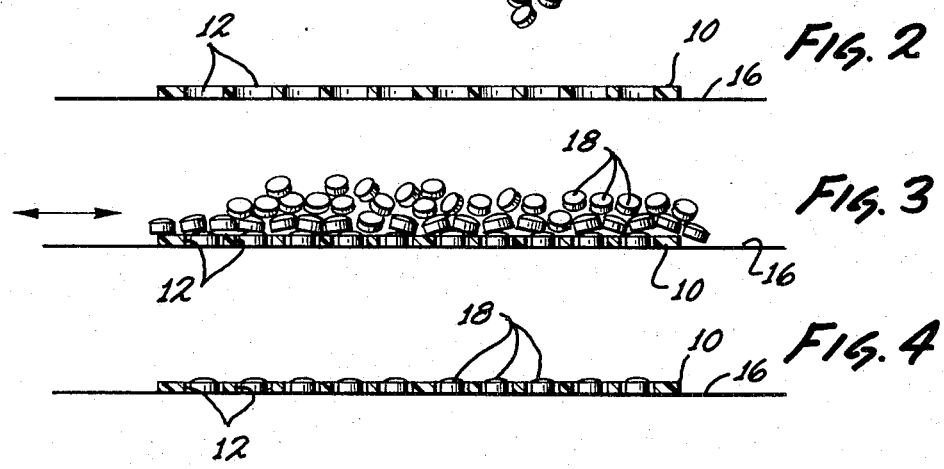
Fig. 2
Fig. 3
Fig. 4
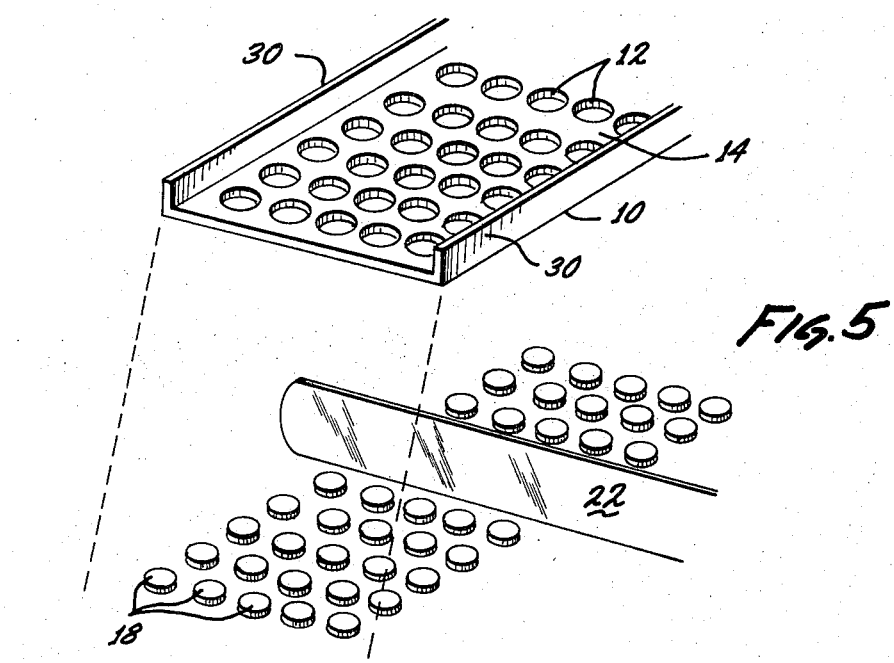
Fig. 5

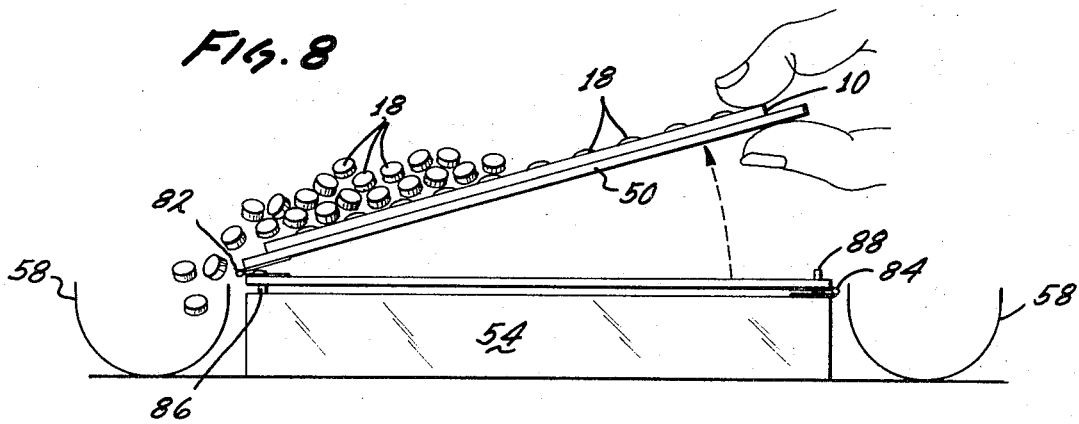
FIG. 8
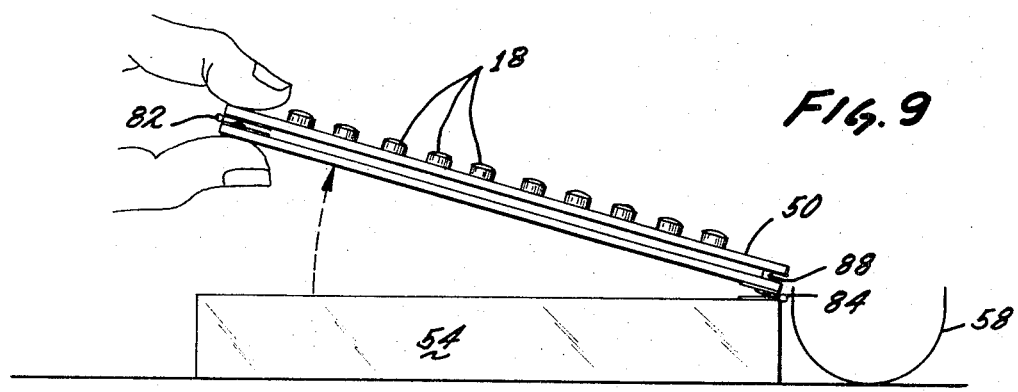
FIG. 9
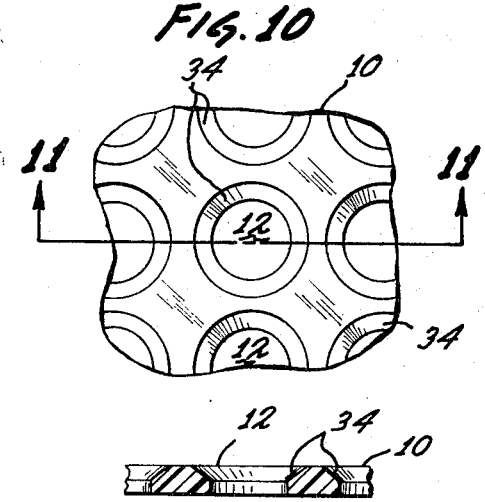
FIG. 10
FIG. 11
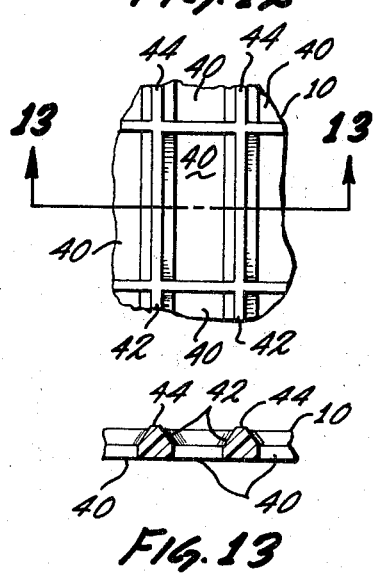
FIG. 12
FIG. 13

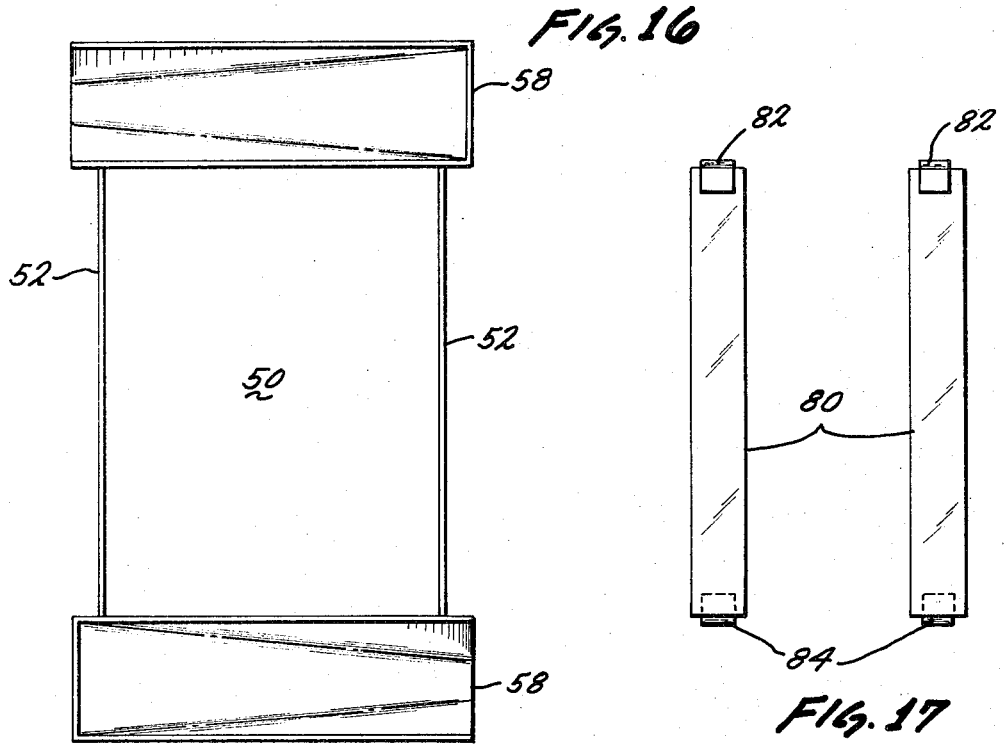
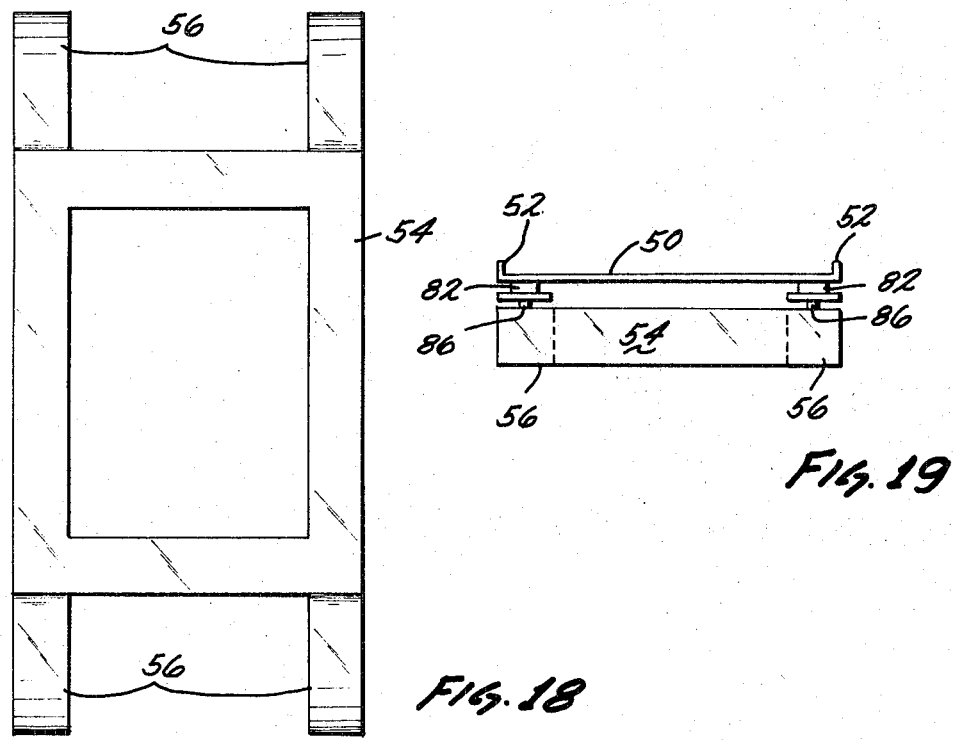

3,848,395

MEANS FOR AND METHOD OF DISPENSING MEDICINAL TABLETS AND CAPSULES

BRIEF SUMMARY OF THE INVENTION AND OBJECTIVES

My invention relates to dispensing medicinal tablets or capsules as to an improved means and method of separating the desired number of tablets or capsules to be dispensed from a bulk supply.

A common present practice of pharmacists in dispensing medicinal tablets and capsules from a bulk supply is merely to count them after dumping a quantity from a bulk supply onto a working surface. This is obviously laborious and time consuming. A pharmacist has to be very careful to avoid error in counting.

The objectives of my invention include:

a. to provide a method of separation of dispensed tablets and capsules from a bulk supply which will save time and reduce possibility of error in counting, b. to provide some mechanisms to facilitate this operation but to avoid the expense and complexity of complete mechanization, c. to provide the above in a manner adaptable to both tablets and capsules and to different sizes of tablets and capsules, d. to provide the above in a manner using preferably quinary rows and files in order to adapt to familiarity and ease of personnel to essentially decimal number systems in general and decimal counting in particular, and e. to provide the means and method of dispensing in a manner characterized by simplicity, low cost, and minimum errors in usage.

My invention will be best understood, together with additional objectives and advantages thereof, from the following description, read with reference to the drawings, in which:

FIGS. 1 – 5 illustrate the method of dispensing medicinal tablets and capsules.

FIG. 1 is a view in perspective of a specific embodiment of a template used in an operation.

FIG. 2 is a side view, partly in section, of a template supported on a work surface and tablets being poured on the template from a bulk supply.

FIG. 3 is a view like FIG. 2 only showing the tablets piled on the template.

FIG. 4 is a view like FIG. 2 only showing tablets in place in openings in the template.

FIG. 5 is a perspective view indicating the tablets in quinary rows and files as the template is lifted away and the use of a spatula to separate the tablets to be dispensed from the remainder.

FIG. 8 is a side view of the apparatus illustrating excess tablets being poured off the template.

FIG. 9 is a view like that of FIG. 8 only showing tablets with the template removed, ready to be poured into the opposite receptacle.

FIG. 10 is an enlarged plan view of a portion of a template.

FIG. 11 is a fragmentary cross-sectional view taken on line 11—11 of FIG. 10.

FIG. 12 is a view like that of FIG. 10 only showing a portion of a template adapted for dispensing capsules instead of tablets.

FIG. 13 is a cross-sectional view taken on line 13—13 of FIG. 12.

FIG. 16 is a plan view of the apparatus shown in FIG. 6.

FIG. 17 is a plan view of intermediate linkage means used between the base and the tray in the apparatus.

FIG. 18 is a plan view of the base of the apparatus alone.

FIG. 19 is an end view of the apparatus.

Figure 6:
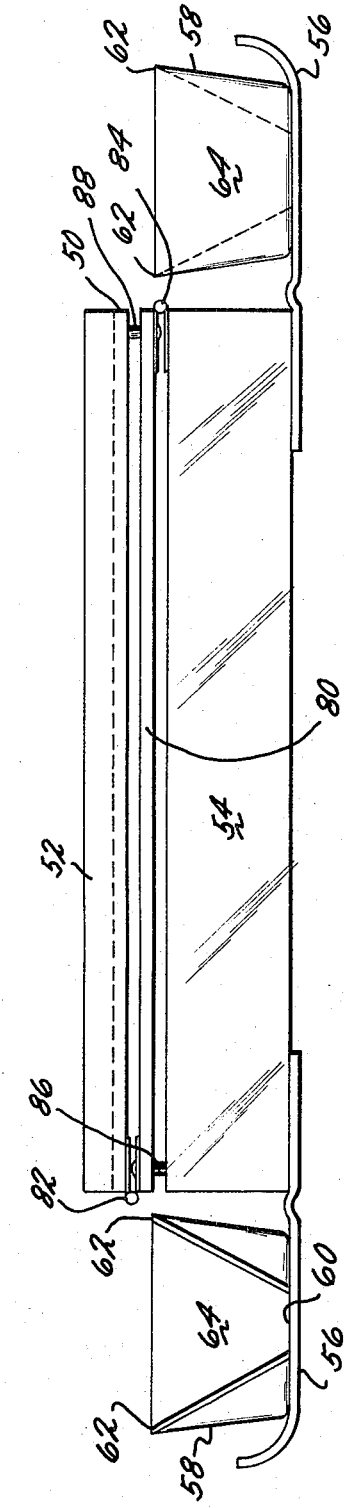
FIG. 6 is a side view of a specific employment of my means of dispensing medicinal tablets and capsules
Figure 7:
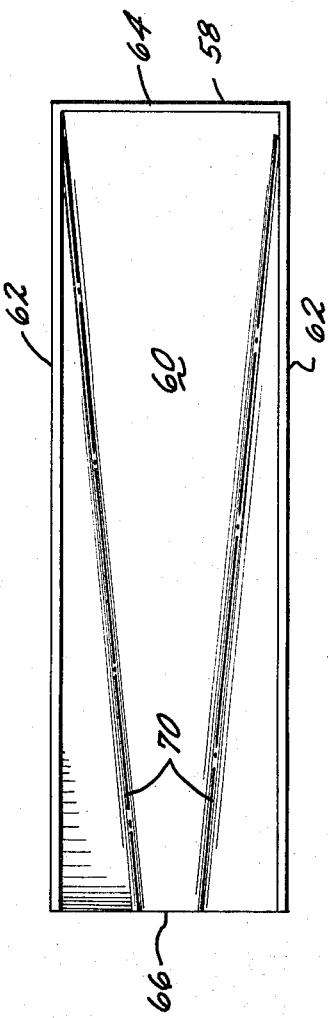
FIG. 7 is a plan view of one of the receptacles used in the apparatus.

I will first describe the method of dispensing medicinal tablets and capsules in conjunction with the showing of FIGS. 1 – 5. As indicated before, the process concerns operations on a planar working surface of separating a selected number of medicinal tablet or capsule objects from a bulk supply of the objects and of depositing them in a container.

One instrumentality used in the method is a template 10. The template has a series of openings 12. It is preferred that openings 12 be arranged in rows and files as it is believed operators will become more adept in counting to the extent objects are arranged in rows and files as opposed to other possible configurations.

It is also preferred that the rows and files be quinary. To define the expression "quinary" for the purpose of this specification and claims, I mean at least five rows and at least five files, and if there are more than five rows or five files that these be in multiples of fives, such as ten. The numerical system in most general use is decimal, and quinary disposition is readily convertible to decimal numbers. Of course quinary or decimal systems would be opposed to something like the use of the quantity of a dozen and divisions and multiples of a dozen, for example. The illustration is five files and ten rows, but there is a small separation by an area of greater spacing at 14 between one five-row section and the other five-row section, which means each end portion is twenty-five, which again is a quinary arrangement that is believed to be easier handled by operators and susceptible of lesser error, than, for example, having ten rows not separated into two quinary groups.

It would be possible to use a purely decimal system instead of a quinary system, i.e., a template having ten rows and ten files, for a total of one hundred openings. That is not the preferred embodiment. One reason for the selection made of fifty openings is that the template would be much larger with a hundred openings. A second reason is that the majority of tablets or capsules dispensed by pharmacists is in numbers of objects of fifty or less, which means that as many as a hundred openings and more than fifty openings are not needed in the majority of dispensing operations. Of course, if a number between fifty and a hundred were needed, one could merely operate template 10 more than one time and I cannot say whether it would be faster in that case to use a template with a hundred openings or to use a template with fifty openings twice.

FIGS. 2 – 4 show template 10 supported on a working surface 16. In the apparatus shown in some other figures the working surface 16 becomes a tray, but surface 16 could be a table or counter, for example.

In FIG. 2, tablets 18 are being poured onto template 10 from a bulk supply 20. These are preferably deposited on the template in a quantity substantially in excess of the number of openings 12 in the template, as illustrated in FIG. 3. The double arrow on the left hand side in FIG. 3 is to suggest a shaking operation of the template in order to move tablets 18 relative to template 10 so that each opening 12 receives one tablet as shown in FIG. 3. Of course the operator instead could leave template 10 stationary and spread tablets 18 back and forth. If it were desired to mechanize this operation, a work surface could be mechanically vibrated.

FIG. 4 indicates that the portion of objects 18 not filling openings 12 in template 10 have been separated. One method of doing this is indicated in FIG. 8. Another method would be merely to manually scrape off excess objects. It will be understood at this point that all openings 12 in template 10 are filled by objects 18 and arranged in quinary rows and files.

FIG. 5 shows the condition when template 10 has been raised, leaving behind the objects 18 arranged in quinary rows and files. The selected number of objects in quinary rows and files may be separated from the remainder and moved to deposit them in a container. In FIG. 5 these are separated by a spatula 22 but more often this may be merely done manually. It will be observed in the illustration that twenty-five objects are being separated out from the remaining twenty-five. The operator could first separate out those objects not wanted to return to a bulk supply 20, or he could first move the selected objects into the container and later dispose of remaining objects by returning them to bulk supply. This can be merely a scraping operation or FIG. 9 suggests a different operation in which movement of tablets is by tilting the work surface. It will be understood in FIG. 9 that if all of the fifty tablets are not to be dispensed, by hand or spatula, portions could be retained on the work surface and, as suggested above, it is the choice of the operator whether to first remove the unwanted tablets from the rows and files.

The final step is to deposit the selected number of medicinal objects in a container. It can be noted from FIGS. 8 and 9 and other figures that this can be accomplished by first putting objects 18 in a receptacle and then pouring them in the container to be given to the purchaser.

The foregoing describes the method of dispensing medicinal tablets and capsules. It will be understood that pharmacists can develop skill in use of the method, so that minimum time and maximum accuracy result. In counting, eventually the pharmacist will develop high skill in knowing where twenty-four, thirty-eight, forty, etc., objects are located in a group of fifty so he separates these so quickly that it could be said he does this automatically or subconsciously. To achieve maximum speed and accuracy, it is felt that quinary rows and files are necessary due to our decimal system and numbers.

Turning now to the apparatus, template 10 is shown in FIGs. 1, 5, 14, and 15 as having two side flange walls 30 and one end flange wall 32. The purpose of this is to tend to retain capsules and tablets poured onto the template in place until removal of the excess, such as by pouring off the end without a wall, as indicated in FIG. 8. The use of these flange walls is optional and some of the figures do not illustrate walls 30 – 32 which can be taken as meaning this is optional. A showing of a template without side or end walls in FIGS. 2, 3, 4, and 8 also facilitates the illustration of what is happening. It will be understood that template 10 usually will be molded of plastic.

Figure 14:
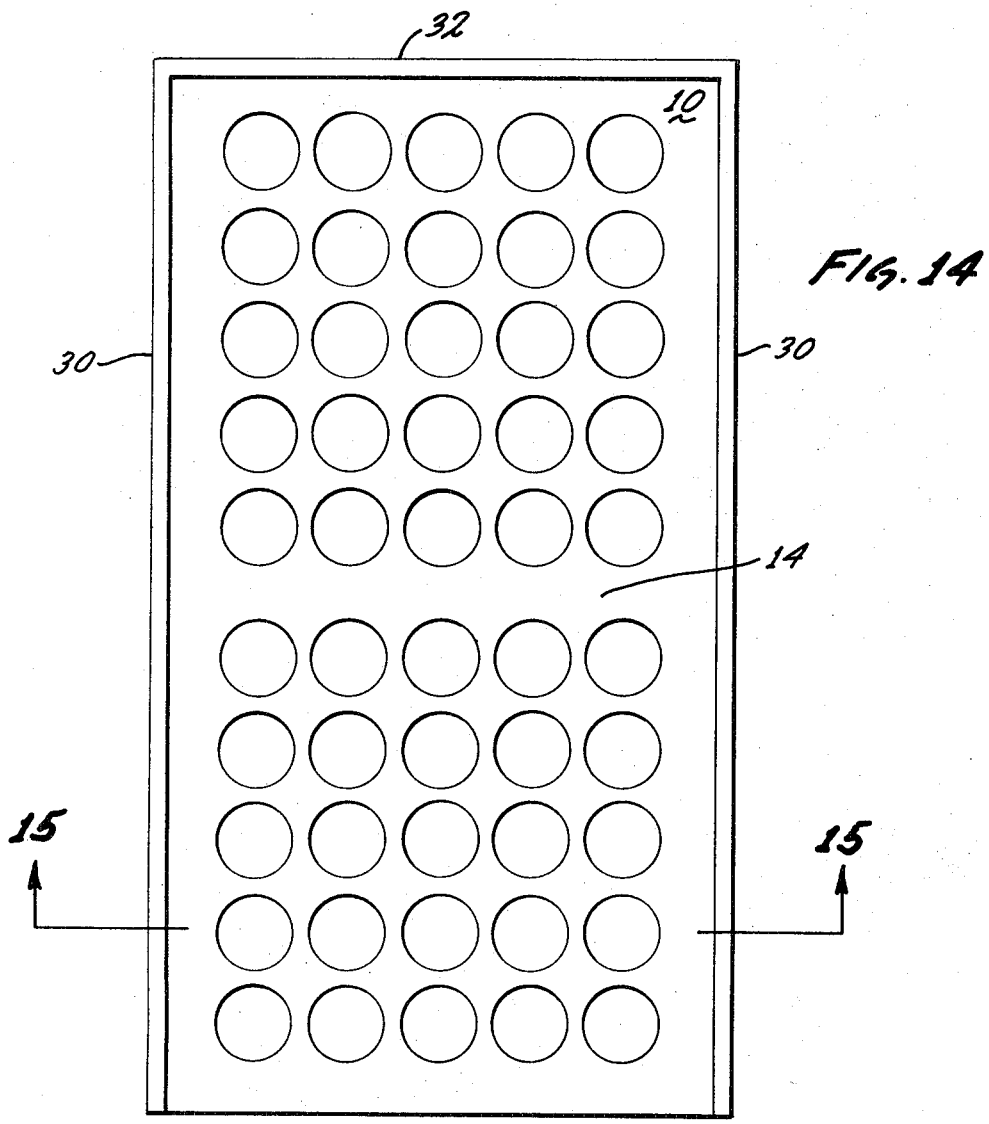
FIG. 14 is a plan view on enlarged scale of a template for tablets.
Figure 15:
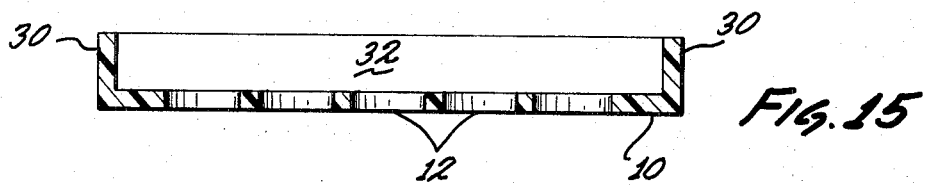
FIG. 15 is a sectional view taken on line 15—15 of FIG. 14.

The quinary rows and files of openings 12 will be particularly clear from FIG. 14. In FIGS. 14 and 15 these are plain openings and are circular so as to adapt for circular tablets. In FIGS. 10 and 11 chamfering of the edges at 34 is illustrated and the purpose of chamfering is to facilitate the movement of capsules into place.

FIGS. 12 and 13 illustrate a modified configuration in openings in the template for capsules. These openings 40 are elongated for capsules but otherwise are arranged in the same rows and files as the circular openings 12 for tablets. The sides of openings 40 are chamfered at 42, again to facilitate feeding of capsules into the openings. A further modification for capsules are slight ridges or ribs 44 between files. These ridges will tend to orient capsules into the disposition of elongation of openings 40 as an excess supply of capsules in manipulated relative to the template in the manner indicated in FIG. 3 and as described above.

One group of templates 10 will be provided for tablets and another group will be provided for capsules. Note that tablets and capsules come in different sizes. This means that a number of templates will have to be provided for different size tablets and a number will have to be provided for different size capsules. This does not mean that each exact diameter of tablet, for example, will have to have a separate template, as a requirement of an opening is that it be large enough to accept one tablet and to exclude two tablets. It will be a matter of preference how many sizes of openings or tablets will be provided, but about six is deemed preferable, with, for example, the smallest roughly ⅛ inch and the largest around ¾ inch. Likewise a number of templates for capsules will be provided with, for example, the smallest around ¼ inch and the largest about an inch.

FIGS. 6 – 9 and FIGS. 16 – 19 illustrate the apparatus used other than the templates. One element is a tray 50 which has its counterpart in the generic working surface 16 in FIGS. 2 – 4. The tray has a planar working surface. Side flange walls 52 preferably are provided, although they are not necessary. They are omitted in FIGS. 8 and 9 for clarity of illustration. The reason not to have end walls (although slight lips can be used) is to permit pouring of medicinal objects off either end in the manner shown in FIGS. 8 and 9. A base 54 is provided which preferably has arm rests 56 to orient the two end receptacles 58.

Receptacles 58 are to temporarily receive excess medicinal objects or to receive medicinal objects to be dispensed. They are at a height and located to receive the objects as they are poured off tray 50 in the manners shown in FIGS. 8 and 9. Receptacles 58 each have a bottom 60, two side walls 62 and one end wall 64. The outer wall 62 can be higher. The other end 66 of each receptacle is open and the bottom is contoured to have a funneling action to facilitate pouring of objects out of open end 66. The funneling contour of the bottom is indicated particularly by the lines 70 in FIG. 7 and by the end views in FIG. 6. The general configuration of the receptacles is trough-shaped except for the open end.

Tray 50 is pivotally mounted relative to base 54 as indicated in FIGS. 8 and 9. This is accomplished by pivotal mounting means including rigid intermediate linkage means between the tray and the base. The rigid intermediate linkage means shown is especially depicted in FIG. 17. Although this could have different forms, it is shown as comprising two elongated members 80 each connected at one end by hinges 82 to tray 50 and connected at the other end by hinges 84 to base 54. To the extent the hinges are configured and disposed as shown, stops 86, 88 compensate for the hinge thickness in keeping tray 50, links 80 and base 54 parallel in side view as shown in FIG. 6, except when pivoted.

FIG. 18 is a plan view of the base which can have different configuration, but is shown essentially as having a box-frame shape. It is probable that all members will be made out of plastic with the possible exception of hinges 82, 84 which could be molded or could be of metal and attached.

The operation of the apparatus has been substantially described. Note in FIG. 8, the illustration is of pouring off excess tablets 18 by holding the template 10 in place and by pouring off the excess into one of the receptacles 58 by raising the tray to pivot about hinges 82. The illustration in FIG. 9 is to pour either the excess tablets 18 or the separated tablets to be dispensed into the other receptacle 58, which in the latter case would then be poured from the receptacle 58 into the container to be given to the customer. Actually the operation shown in FIG. 9 is not entirely accurate unless all fifty tablets 18 were to be dispensed. If, for example, twenty-five were to be dispensed, one way to operate would be to remove the excess twenty-five, say by scraping, into the receptacle on the left to be returned to the supply, and then by tilting the tray as shown to move the other twenty-five into the receptacle at the right, to be then transferred into the container to be given to the purchaser. Another way to operate, would be to retain the excess on the left by hand or spatula and to pour off the selected number to the receptacle on the right, and later to dispose of the excess. It will be understood that there is some choice in method of operation of the apparatus, such as just discussed, but the pharmacist will become proficient and do these operations very rapidly.

Having thus described my invention, I do not wish to be understood as limiting myself to the precise details shown and described, but instead I wish to cover those modifications which will occur to those skilled in the art after learning of my invention, and which are properly within the scope of my invention.

I claim:

1. Means for separating a selected number of medicinal tablet or capsule objects from a bulk supply of said objects, comprising:
   a. a tray having a planar working surface,
   b. a template, positioned on said working surface, having rows and files of openings, each of said openings being of a size to accept only one of said objects, whereby upon dumping of said objects from said bulk supply on said template and by manipulation, all of the openings will be filled,
   c. a base and pivotal mounting means between said base and said tray so that said tray can be tilted toward an end thereof to pour off said objects under force of gravity, and
   d. a receptacle under said end of said tray located to receive said objects when poured off said end of said tray by tilting of said tray.

2. The subject matter of claim 1 in which said rows and files of openings are in quinary numbers.

3. The subject matter of claim 2 in which there are fifty openings arranged in ten rows and five files.

4. The subject matter of claim 1 in which said template has a raised margin at two sides and one end to tend to retain said objects thereon.

5. The subject matter of claim 1 in which said openings are elongated in the direction of said files to accommodate capsules and there are ribs between files to tend to orient the longitudinal axes of capsules in the direction of elongation of said openings.

6. The subject matter of claim 1 in which said pivotal mounting means supports said tray on said base in a manner so that said tray can be tilted toward either end thereof, and there being a receptacle under each end of said tray, so that objects can be poured off either end of said tray into said receptacles.

7. The subject matter of claim 6 in which said tray has raised margins at each side to tend to hold objects thereon but the ends of said tray are generally flush with said working surface to facilitate pouring of objects from said ends.

8. The subject matter of claim 6 in which said receptacles each is trough-shaped with open tops, closed sides, one closed end and one open end and narrowing near the open end to achieve a funneling effect in pouring objects into a container.

9. The subject matter of claim 6 in which said pivotal mounting means includes first hinge means attached to one end of said tray, second hinge means attached to the other end of said base, and rigid intermediate linkage means between said tray and said base having one end connected to said first hinge means and the other end connected to said second hinge means, the axes of said hinge means being lateral of said tray, whereby said tray can be pivoted about said first hinge means to achieve tilting about one end thereof and whereby said tray and intermediate linkage means can be pivoted together about said second hinge means to achieve tilting of said tray about the other end thereof.

10. The process on a planar working surface of separating a selected number of medicinal tablet or capsule objects from a bulk supply of said objects and depositing them in a container, comprising:
   a. providing a template with quinary rows and files of openings, each opening being of a size to accept only one of said objects, and placing said template on said working surface,
   b. dumping a quantity of said objects in excess of the number of said openings on said template and moving said quantity of objects relative to said template until said openings are filled,
   c. separating the portion of said quantity of objects not filling said openings,
   d. removing said template leaving objects, formerly in said openings, arranged in quinary rows and files, and
   e. counting the selected number of objects in said quinary rows and files and moving the selected number of objects to deposit them in said container.

11. The subject matter of claim 10 in which said working surface is movable and in which said portion of said quantity of said objects not filling said objects is removed by tilting said working surface to pour said portion off of said working surface.

* * * * *